Aug. 21, 1956     R. K. BOYER     2,759,647
VALVE STEM ADAPTER
Filed July 14, 1953
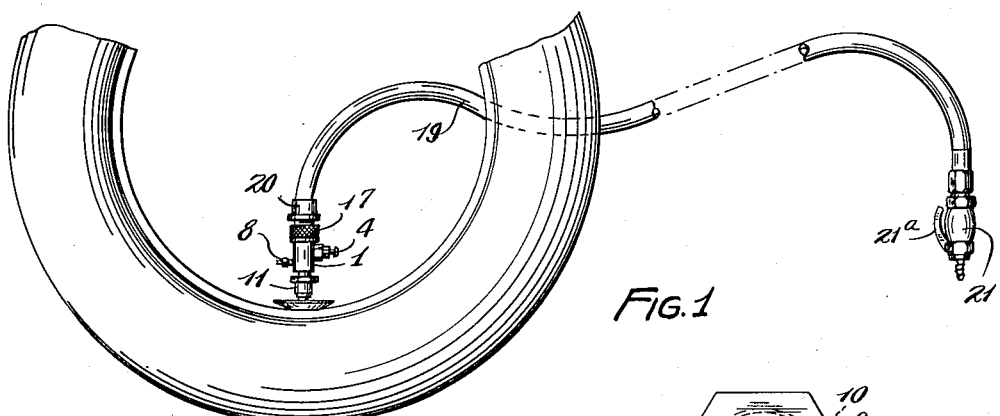
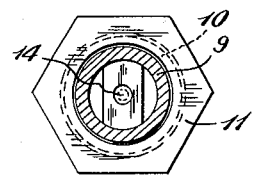
Fig. 4
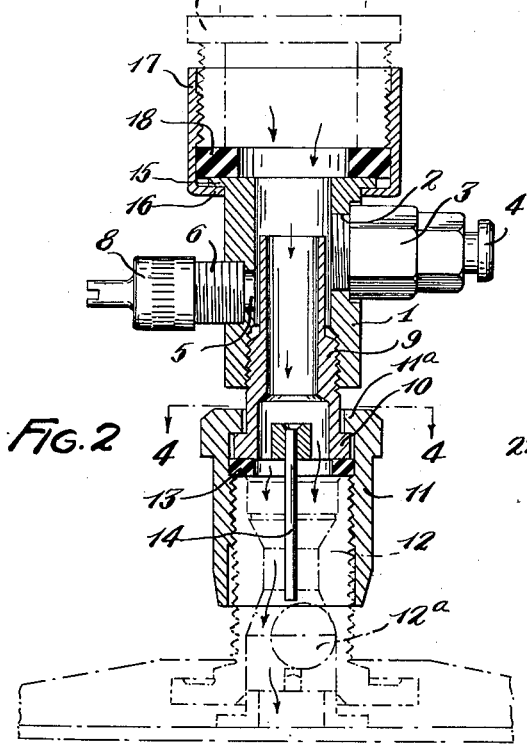
Fig. 2
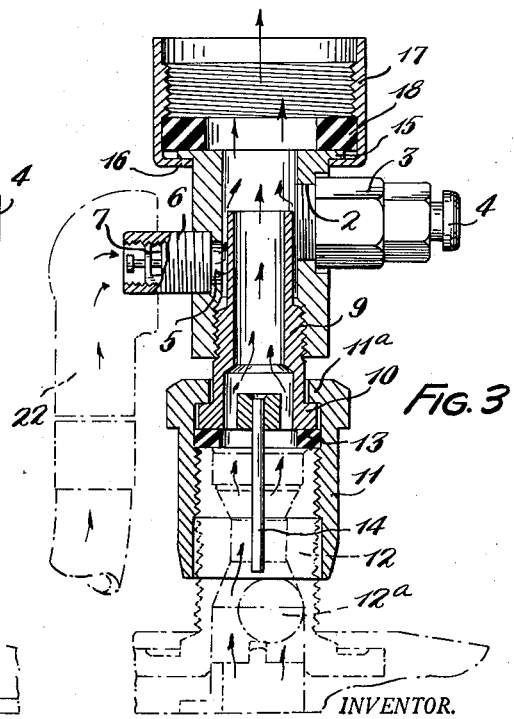
Fig. 3
INVENTOR.
RALPH K. BOYER
BY Hudson, Boughton,
Williams, David & Hoffmann
ATTORNEYS

United States Patent Office 2,759,647
Patented Aug. 21, 1956

2,759,647

VALVE STEM ADAPTER

Ralph K. Boyer, Cleveland, Ohio, assignor to The Dill Manufacturing Company, Cleveland, Ohio, a corporation of Ohio Application July 14, 1953, Serial No. 367,950

4 Claims. (Cl. 226—20.8)

The present invention relates to what may properly be called an adapter and is intended for use with a valve stem structure particularly adapted for use with the tubes of supersized tires such as are intended for use in connection with earth moving machinery, tractors, and similar vehicles. A valve stem for use with such tires is described in my copending application, Serial No. 354,685, filed May 13, 1953, wherein a valve stem of enlarged diameter and capacity for the supply of air or fluid to the tube of such a tire or the exit of air and fluid from such a tire, is described.

Reference should be had to the accompanying drawings in which,

Fig. 1 is an elevation showing the adapter of the present application in position upon the valve stem of a tire and connected with a hose for supplying a liquid or fluid to the interior of the tire;

Fig. 2 is a sectional elevation of the adapter and with cooperating parts shown in dotted lines;

Fig. 3 is an elevation with portions in section showing the application and use of the adapter when exhausting a fluid or liquid from the tire; and, Fig. 4 is a section on the line 4—4 of Fig. 2.

Shown in dotted lines in Fig. 2 is an elevation in section of a valve stem of enlarged capacity such as shown in our copending application, Serial No. 354,685. The adapter consists of a central body portion 1, provided with an opening 2, which is adapted to receive, screwed into the same, a relief valve 3 of any common construction, which may be operated by pressure depression of the member 4. This body 1 is also provided with an opening 5 which is adapted to receive in the threaded opening 5 what may be termed a casing 6, within which there is housed a valve insides 7 of well-known construction. The threaded member 6 is hollow and is adapted to receive a closure cap 8 which is of ordinary construction used in connection with valve stems for tires and needs no further description.

The casing 1 is hollow and at its lower end is threaded to receive the member 9 which at its upper end is of lesser diameter than the interior diameter of the member 1, thereby providing a restricted passageway the inner end of which the members 6 and 3 communicate. This member 9 extends upwardly into the chamber of the member 1 and beyond the opening 5 and the opening 2.

The lower part of the member 9 is provided with a flange 10 which receives a threaded cap 11, having an inturned portion 11a that engages with the flange 10 to provide free relative turning of the members just mentioned. This member 11 is adapted to be screwed upon the outside threads upon a valve stem, such for instance, as indicated at 12, and which is of the type shown in a previous application, Serial No. 354,685. In order to seal the end of the valve stem with respect to the interior of the member 9 a packing 13 is provided which is compressed between the flange 10 and the end of the valve stem 12 when the member 11 is completely threaded upon the stem.

The member 9 at the lower part thereof has attached thereto, an extending rod 14 which is of such length that when the adapter is mounted upon the stem, the rod 14 will extend beyond the narrow seat in the valve stem 12 and prevent the check-ball 12a from closing passage therethrough.

At its upper end the body 1 is provided with an outwardly extending flange 15 which is engaged by an inturned flange 16 of an interiorly threaded coupling member 17. Within the member 17 there is a packing member 18.

For the purpose of passing a fluid such as water into the tire through the adapter and valve stem heretofore described, a common garden hose may be connected with the coupling 17, the opposite end of the hose being connected with a source of water or liquid under pressure. When air is supplied to the interior of the tire, a hose or conduit, such as illustrated at 19, may be employed, one end of which is provided with a threaded coupling member 20, which coupling is threaded into the coupling member 17 and engages with the packing member 18 forming the seal. The opposite end of the hose or conduit 19 is provided with a valve 21 of ordinary construction which may be operated by means of a lever 21a. This valve is in turn connected with a source of air under pressure and upon operation of the valve, air may be admitted to the interior of the tire through the adapter and the valve stem which have heretofore been described.

Where air inflation is employed, the pressure of the air within the tire may be gauged by removing the cap 3 and then applying thereto a proper air gauge of which there are numerous types that are well-known.

In the event that water or similar fluid has been supplied to the interior of the tube of the tire, through the hose or conduit 19, there will be a displacement of air within the tube as the fluid begins to fill the tube and this accumulation of air may be vented by pushing on the member 4 which is an ordinary relief valve and needs no particular description.

In Fig. 3, the construction shown is the same as that shown in Fig. 2, and additionally the use of the adapter in connection with exhausting the air or fluid from a tire. The connection between the valve stem and the adapter is precisely the same as heretofore described.

The extension or member 6 is adapted to receive an air chuck 22 of usual and well-known construction connected to a source of air under pressure, which will admit air under pressure through the valve insides contained within the extension 6, which air pressure will act to produce a Venturi effect in connection with the extension on the member 9 thus inducing a flow of air or liquid as the case may be, from the interior of the casing out through the top portion of the adapter. In this manner the contents of the tube, whether the contents be air or a fluid, will be rapidly exhausted from the tube.

As before stated, the adapter is intended to be used in connection with a valve stem which may be termed supersized in that the passage within the interior of the stem is of much greater diameter than that which is ordinarily employed and therefore gives much more efficient either admission of air or fluid, or exhaust of air or fluid, into or out of the tire tube than ordinary valve stems.

This is important in connection with tires of supersize which are used in connection with earth moving machines or tractors wherein the time element in either filling of a requisite amount of air or liquid, or exhausting the same, normally requires a considerable period of time, and the use of a valve stem such as set forth in our prior application together with the present adapter, permits much more rapid inflation or deflation, or the filling with liquid or the emptying of liquid than could otherwise be accomplished.

Having thus described my invention, I claim:

1. A valve stem adapter for use with a valve stem which has a freely movable ball valve therein comprising a casing having a central unobstructed opening therethrough, a swivel connection at the end thereof adapted to cooperate with a hose coupling, a hollow member attached to said casing at one end thereof, a rod carried by said member and extending axially therefrom and adapted for engagement with and depression of the movable ball valve when the adapter is mounted upon a valve stem, a coupling carried by the last-mentioned member adapted for attachment to a valve stem.

2. A valve stem adapter comprising a casing having a central unobstructed opening therethrough, a tubular member secured to said casing at one end thereof which member has the tubular portion extending into the said casing, the outer diameter of the said tubular portion being slightly less than the internal diameter of the opening in the casing, swivel means at one end of the casing adapted for attachment to a hose coupling, swivel means carried by the tubular member adapted for attachment to a valve stem, a tubular member attached to the said casing and in communication with the clearance space between the interior wall of the casing and the outer wall of the tubular member extending into the casing, said tubular member carried by the casing being adapted to receive a means for supplying compressed air which will be discharged into the before-mentioned space clearance between the inner wall of the casing and the outer surface of the tubular member extending therein to create a Venturi effect.

3. A valve stem adapter for use with a valve stem which has a freely movable ball valve therein comprising a casing having a central unobstructed opening therethrough, a swivel connection at one end thereof adapted to cooperate with a hose coupling, a hollow member attached to said casing at one end thereof, a coupling carried by said last-mentioned member adapted for attachment to a valve stem, a rod carried by the said hollow member and extending axially therefrom and into the said last-mentioned coupling, said rod adapted to engage a ball within the said valve stem to depress the same.

4. A valve stem adapter for use with a valve stem which has a freely movable ball valve therein comprising a casing having a central unobstructed opening therethrough, a swivel connection at one end thereof adapted to cooperate with a hose coupling, a hollow member attached to said casing at one end thereof, a coupling carried by said last-mentioned member adapted for attachment to a valve stem, a rod carried by the said hollow member and extending axially therefrom and into the said last-mentioned coupling, said rod adapted to engage a ball within the said valve stem to depress the same, and a relief valve communicating with the interior of the said casing operable to release air which may be trapped in the said casing.

References Cited in the file of this patent
UNITED STATES PATENTS

| | | |
|---|---|---|
| 1,427,105 | Handlan | Aug. 29, 1922 |
| 2,328,863 | Threm | Sept. 7, 1943 |
| 2,349,594 | McMahan | May 23, 1944 |
| 2,434,991 | Crowley | Jan. 27, 1948 |
| 2,581,914 | Darrow | Jan. 8, 1952 |
| 2,592,759 | Sullivan | Apr. 15, 1952 |